(12) United States Patent
Tsung

(10) Patent No.: US 6,324,931 B1
(45) Date of Patent: Dec. 4, 2001

(54) STRAIGHT BEVEL GEARS WITH IMPROVED TOOTH ROOT AREA GEOMETRY AND METHOD FOR MANUFACTURING FORGING DIE FOR MAKING THEREOF

(75) Inventor: Wei-Jiung Tsung, Fort. Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/552,314

(22) Filed: Apr. 19, 2000

(51) Int. Cl.[7] ................................ F16H 55/17
(52) U.S. Cl. .................. 74/459.5; 74/457; 74/462; 72/324; 29/893.35
(58) Field of Search .................... 74/459.5, 457, 74/462; 72/324; 29/893.3, 893.35

(56) References Cited

U.S. PATENT DOCUMENTS

| | | |
|---|---|---|
| 2,961,888 * | 11/1960 | Wildhaber ................ 74/459.5 |
| 3,298,219 | 1/1967 | Schober . |
| 3,675,459 | 7/1972 | Dohman . |
| 3,731,516 | 5/1973 | Dohman et al. . |
| 5,052,210 | 10/1991 | Hoge . |
| 5,271,289 * | 12/1993 | Baxter, Jr. ................ 74/462 |
| 5,275,046 | 1/1994 | Nagpal et al. . |
| 5,396,160 | 3/1995 | Chen . |
| 5,453,933 | 9/1995 | Wright et al. . |
| 5,552,995 | 9/1996 | Sebastian . |
| 5,680,317 | 10/1997 | Watanabe . |
| 5,787,753 | 8/1998 | Dougherty . |
| 5,896,643 | 4/1999 | Tanaka . |

* cited by examiner

Primary Examiner—David Fenstermacher
(74) Attorney, Agent, or Firm—Liniak, Berenato Longacre & White

(57) ABSTRACT

A method for designing root area geometry of a straight bevel gear providing reduced stress concentration and increased tooth strength. Also, a method for making a forging die for manufacturing gears having improved tooth root geometry. The method includes the steps of designing the straight bevel gear having improved root area geometry, designing an electrode for an electric discharge machining using CAD/CAM device, manufacturing the electrode, and manufacturing the forging die employing the electric discharge machining process.

2 Claims, 3 Drawing Sheets

STRAIGHT BEVEL GEARS WITH IMPROVED TOOTH ROOT AREA GEOMETRY AND METHOD FOR MANUFACTURING FORGING DIE FOR MAKING THEREOF

FIELD OF THE INVENTION

The present invention relates to gears and method for manufacturing thereof in general, and particularly to straight bevel gears having improved tooth root geometry and a method for manufacturing a forging die for making thereof.

BACKGROUND OF THE INVENTION

Straight bevel gears are used for many automotive applications, such as differential gearing. Currently, gear manufacturers employ a number of various method for making gears. Recently, forging technology has achieved tremendous development and become very popular. Compared to machining, forging has its advantages of improving the product quality by achieving a high stiffness in the material without cutting the material flow lines, good surface condition at the formed part, and work hardening that increases wear resistance, and quick cycle time suitable for mass production.

Forging die design is essential for the manufacturing of the gear because it determines the shape of the gear and, therefore, performance of the gearing incorporating this gear. Currently, forging dies for straight bevel gears are generated by a gear cutter. Thus, root area of the straight bevel gear is determined by the cutter edge radius. The current method of making the gear cutter is not optimizes a cutter edge radius, which creates stress concentration in a gear root area.

SUMMARY OF THE INVENTION

The present invention alleviates the drawbacks of the prior art.

The present invention provides a method for designing gear tooth profiles. An important element of this invention is a technique for defining a root area profile of the gear tooth that provides reduced stress concentration and improved durability over the current designs. The present invention discloses mathematical equations determining the position of any point on the surface of the gear root area.

In accordance with the preferred embodiment of the present invention, the bevel gear is manufactured by die forging. The method for manufacturing the gear forging die is contemplated in the present invention. This method includes the steps of: (a) determining a gear root area geometry, (b) designing a straight bevel gear having the gear root area geometry as determined in the previous step, (c) designing an electrode for an electric discharge machining (EDM) on a CAD/CAM device using numerical data from the step (b), (d) manufacturing said electrode for the electric discharge machining, and (e) manufacturing said forging die employing the electric discharge machining process using said electrode. Thus, the present method eliminates the need in the gear cutter, and the forging die manufactured in accordance with the present method more closely corresponds to the profile of the originally designed gear.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 1:
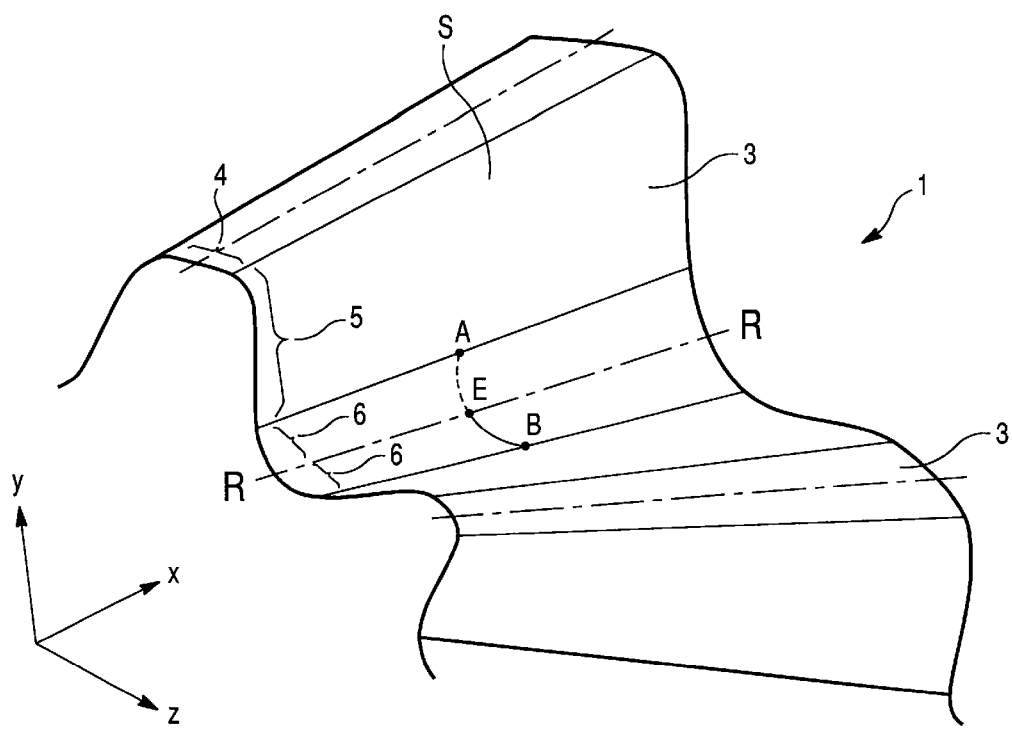
FIG. 1 is a partial perspective view of a straight bevel gear.
Figure 2:
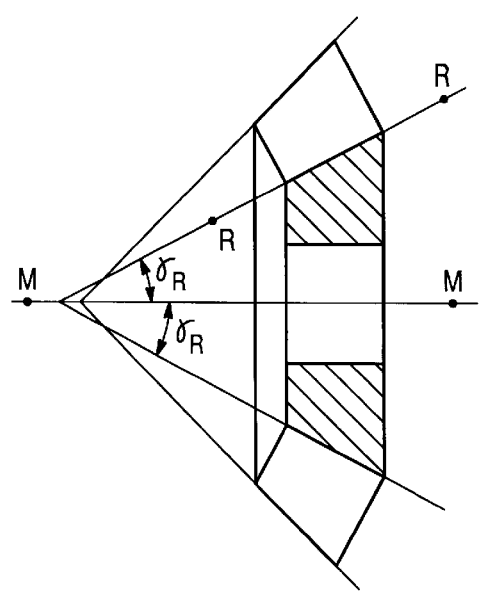
FIG. 2 is a cross sectional view of the straight bevel gear.

FIGS. 1 of the drawings illustrates a straight bevel gear 1 placed in a Cartesian coordinate system x-y-z. The straight bevel gear 1 has a plurality of teeth 3 forming a gear teeth surface S comprising a plurality of alternating top lands 4, working surfaces 5 and root surfaces 6. A gear root line RR represents a line of generatrix of a gear root cone. The gear root cone is formed by rotating the line RR about a gear axis MM with an angle $\gamma_R$ as illustrated in FIG. 2. For the sake of simplify, the gear 1 is located in the coordinate system x-y-z in such a way that a coordinate axis x coincides with the gear axis MM.

As it is well known, the straight bevel gear tooth form, in general, can be in the form of spherical involute or octoid. For this kind of generation of the tooth form, any point on the line formed by intersecting the gear surface S with a plane surface perpendicular to a gear axis x or with a surface perpendicular to the gear root line RR, may be represented by a position vector r and a unit normal vector n with respect to the Cartesian coordinate system x-y-z.

Figure 3:
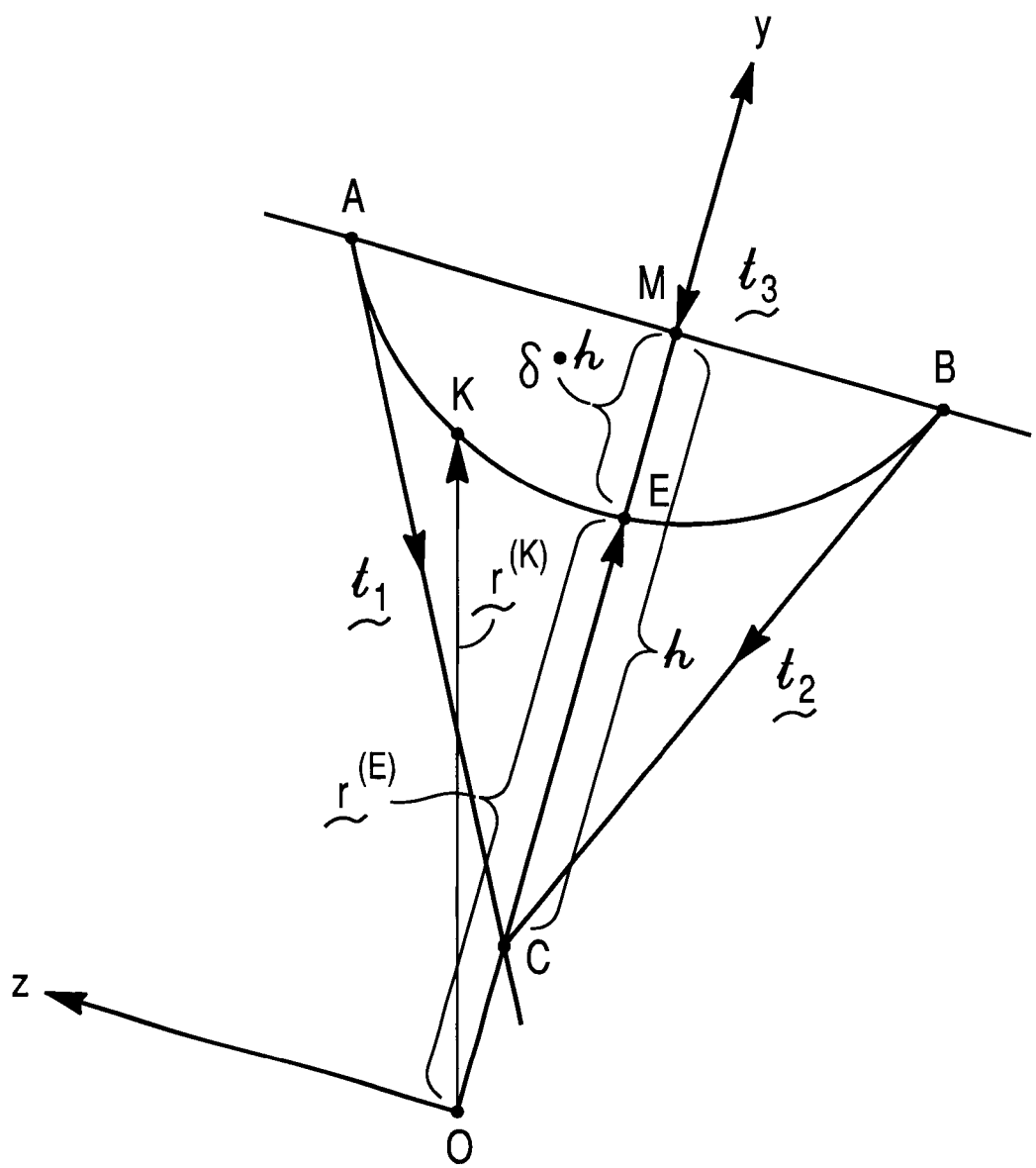
FIG. 3 is a schematic view of a root area profile in the y-z plane.

One aspect of the present invention is a method for determining a root area geometry. First, points A and B on the root surface 5 are selected, wherein the point B is the mirror image of the point A with respect to a plane that passes through the gear axis x. A point E is located on the line R—R that is, as was noted above, the generatrix of the root cone. The position vector of the point E, illustrated in FIG. 2, is determined be the following equation:

$$\underline{r}^{(E)} = \underline{r}^{(A)} + \overline{AC} \cdot \underline{t}_1 - (1-\delta) \cdot h \cdot \underline{t}_3, \tag{1}$$

where $\underline{r}^{(E)}$—a position vector of the predetermined point E;

$\underline{r}^{(A)}$—a position vector of a predetermined point A on the tooth root surface other than the line R—R;

$\overline{AC}$—a distance between the points A and C;

$\underline{t}_1$—a unit tangent vector of the point A;

h—a distance between the points C and M;

$\underline{t}_3$—a unit vector along a line $\overline{ME}$, where a point M is a middle of a line $\overline{AB}$, a point B is symmetrical to the point A relative to a plane extended through the axis x and the line R—R, and is located on the root area 6 of the adjacent gear tooth, C is a point of intersection of the unit tangent vectors $\underline{t}_1$ and $\underline{t}_2$, where $\underline{t}_2$ is a unit tangent vector of the point B. As illustrated in FIG. 3, the unit tangent vectors $\underline{t}_1$ and $\underline{t}_2$ are disposed along lines $\overline{AC}$ and $\overline{BC}$, respectively.

Components of the equation (1) are illustrated in FIG. 3. Assuming that the position vectors $\underline{r}^{(A)}$ and $\underline{r}^{(E)}$, the unit vectors $\underline{t}_1$, $\underline{t}_2$, $\underline{t}_3$, and the distance $\overline{AC}$ are known, the unknown coefficient δ could determined from the equation (1)

$$\delta = (\underline{r}^{(E)} - \underline{r}^{(A)} - \overline{AC} \cdot \underline{t}_1 + h \cdot \underline{t}_3)/(\underline{t}_3 \cdot h). \tag{2}$$

Any point K on the arc $\overline{AEB}$ (i.e. on the tooth surface located in the gear tooth root area 6) can be determined by using a Parametric Blending Function, thus determining the tooth root area. The following equation is employed to determine a position vector of the point K:

$$r^{(K)}=F_1 \cdot r^{(A)}+F_2 \cdot r^{(B)}+4 \cdot F_3 \cdot \delta \cdot (r^{(C)}-r^{(A)})+F_4 \cdot 4 \cdot \delta \cdot (r^{(B)}-r^{(C)}), \quad (3)$$

where $r^{(B)}$—a position vector of the predetermined point B on the tooth surface in the gear tooth root area other than the gear tooth root cone, known;

$F_1=2u^3-3u^2+1$;

$F_2=-2u^3+3u^2$;

$F_3=u^3-2u^2+u$;

$F_4=u^3-u^2$;

here u is a real number, $0 \leq u \leq 1$.

When we solve the equation (3) for a series of values u, we obtain the position of the points K on the arc AEB. Thus, the straight gear tooth root area geometry is defined. Since the tooth root area in accordance with the present invention is defined as a smooth curve, the tooth stress concentration is reduced and the tooth strength is increased.

The geometry of the head area of the gear is determined using conventional methods, well known in the prior art.

Figure 4:
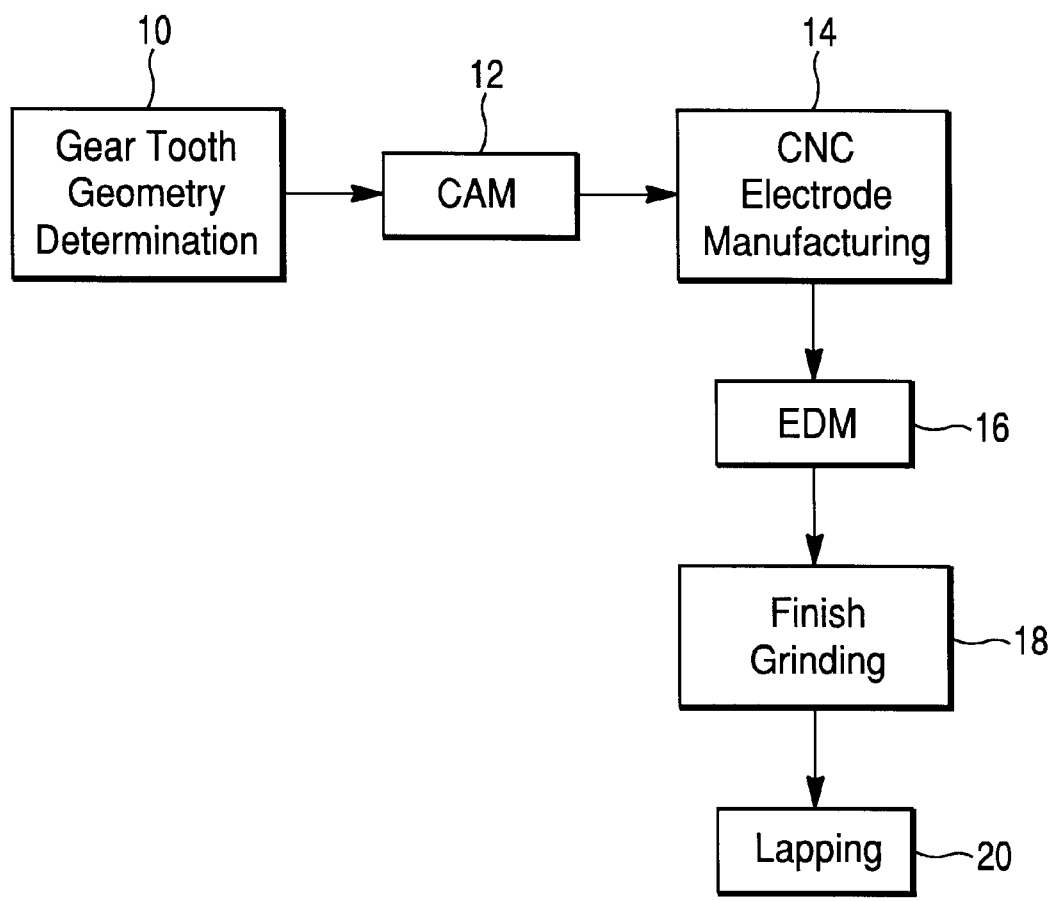
FIG. 4 is a flow chart of a method for manufacturing a gear-forging die.

Another aspect of the present invention is a method for manufacturing a forging die for making net formed (straight bevel) gears having improved tooth root geometry, depicted schematically in FIG. 4.

The first step 10 of this method is to determine the tooth root and head area geometry using the method described in detail above.

The next step 12 in the process of manufacturing the forging die is using a Computer Aided Manufacturing (CAM) device for designing an electrode for an Electrical Discharge Machining (EDM) apparatus. The CAM device uses numerical data regarding the gear tooth geometry as described above, thus, eliminating the step of manufacturing a master gear by a special gear cutter.

Then, the CAM data is transferred to a Computer Numerical Control (CNC) machine tool for manufacturing the electrode (step 14). Later, thus manufactured electrode is used in the conventional EDM process 16 well known to those skilled in the art. Finally, finish grinding 18 and lapping 20 are applied to obtain a mirror finished surface to the die.

Therefore, the novel method for manufacturing the forging die for making straight bevel gears with improved root geometry of the present invention as disclosed in the above-described embodiment allows to make straight bevel gears with improved root geometry providing reduced stress concentration and increased tooth strength. When used in manufacturing, the present invention allows to reduce the production cost and improve the quality of the manufacturing.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed hereinabove was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A gear having a plurality of teeth, each tooth having a working surface contacting a working surface of a tooth of a meshing gear, said working surface of each tooth of the gear being between a top land and a bottom land defining a tooth height, and wherein the working surface has a root profile geometry of which is determined in accordance with the following equation:

$$r^{(K)}=F_1 \cdot r^{(A)}+F_2 \cdot r^{(B)}+F_3 \cdot 4 \cdot \delta \cdot (r^{(C)}-r^{(A)})+F_4 \cdot 4 \cdot \delta \cdot (r^{(B)}-r^{(C)}),$$

where $r^{(K)}$—a position vector of any point K on a tooth surface located in a gear tooth root area;

$r^{(A)}$—a position vector of a predetermined point A on the tooth surface in the gear tooth root area other than the gear tooth root cone, known;

$r^{(B)}$—a position vector of a predetermined point B on the tooth surface in the gear tooth root area other than the gear tooth root cone, known;

$F_1=2u^3-3u^2+1$;

$F_2=-2u^3+3u^2$;

$F_3=u^3-2u^2+u$;

$F_4=u^3-u^2$;

u is a real number, $0 \leq u \leq 1$;

δ—a coefficient determined from the following equation:

$$\delta=(r^{(E)}-r^{(A)}-\overline{AC} \cdot t_1+h \cdot t_3)/(h \cdot t_3),$$

where $r^{(E)}$—a position vector of a predetermined point E on a tooth surface located in a gear tooth root cone, known;

$\overline{AC}$—distance between the points A and C;

$t_1$—a unit tangent vector of the point A;

$t_2$—a unit tangent vector of the point B;

$r^{(C)}$—a position vector of a point C being an intersection point of said unit vectors $t_1$ and $t_2$, known;

$t_3$—a unit vector along a line $\overline{ME}$, where a point M is a middle of the line $\overline{AB}$.

2. A method for making a forging die for manufacturing gears having improved tooth root geometry, said method comprising the steps of:

(1) determining a gear root area geometry;

(2) designing a straight bevel gear having the gear root area geometry as determined in the step (1);

(3) designing an electrode for an electric discharge machining, said electrode being in the form of a facsimile of the net formed gear determined in the step (2);

(4) manufacturing said electrode for the electric discharge machining and (5) manufacturing said forging die employing the electric discharge machining process using said electrode,
wherein said gear root area geometry is determined in accordance with the following equation:

$$r^{(K)}=F_1 \cdot r^{(A)}+F_2 \cdot r^{(B)}+F_3 \cdot 4 \cdot \delta \cdot (r^{(C)}-r^{(A)})+F_4 \cdot 4 \cdot \delta \cdot (r^{(B)}-r^{(C)}),$$

where $r^{(K)}$—a position vector of any point K on a tooth surface located in a gear tooth root area;

$r^{(A)}$—a position vector of a predetermined point A on the tooth surface in the gear tooth root area other than the gear tooth root cone, known, $r^{(B)}$—a position vector of a predetermined point B on the tooth surface in the gear tooth root area other than the gear tooth root cone, known;

$F_1 = 2u^3 - 3u^2 + 1$;

$F_2 = -2u^3 + 3u^2$;

$F_3 = u^3 - 2u^2 + u$;

$F_4 = u^3 - u^2$;

u is a real number, $0 \leq u \leq 1$;

$\delta$—a coefficient determined from the following equation:

$$\delta = (r^{(E)} - r^{(A)} - AC \cdot t_1 + h \cdot t_3)/(h \cdot t_3),$$

where $r^{(E)}$—a position vector of a predetermined point E on a tooth surface located in a gear tooth root cone, known;

AC—a distance between the points A and C;

$t_1$—a unit tangent vector of the point A;

$t_2$—a unit tangent vector of the point B;

$r^{(C)}$—a position vector of a point C being an intersection point of said unit vectors $t_1$ and $t_2$, known;

$t_3$—a unit vector along a line ME, where a point M is a middle of the line AB.

* * * * *